May 18, 1926.
B. A. LINDERMAN
PRESSURE CONTROL VALVE
Filed Nov. 24, 1924
1,585,038
3 Sheets-Sheet 1
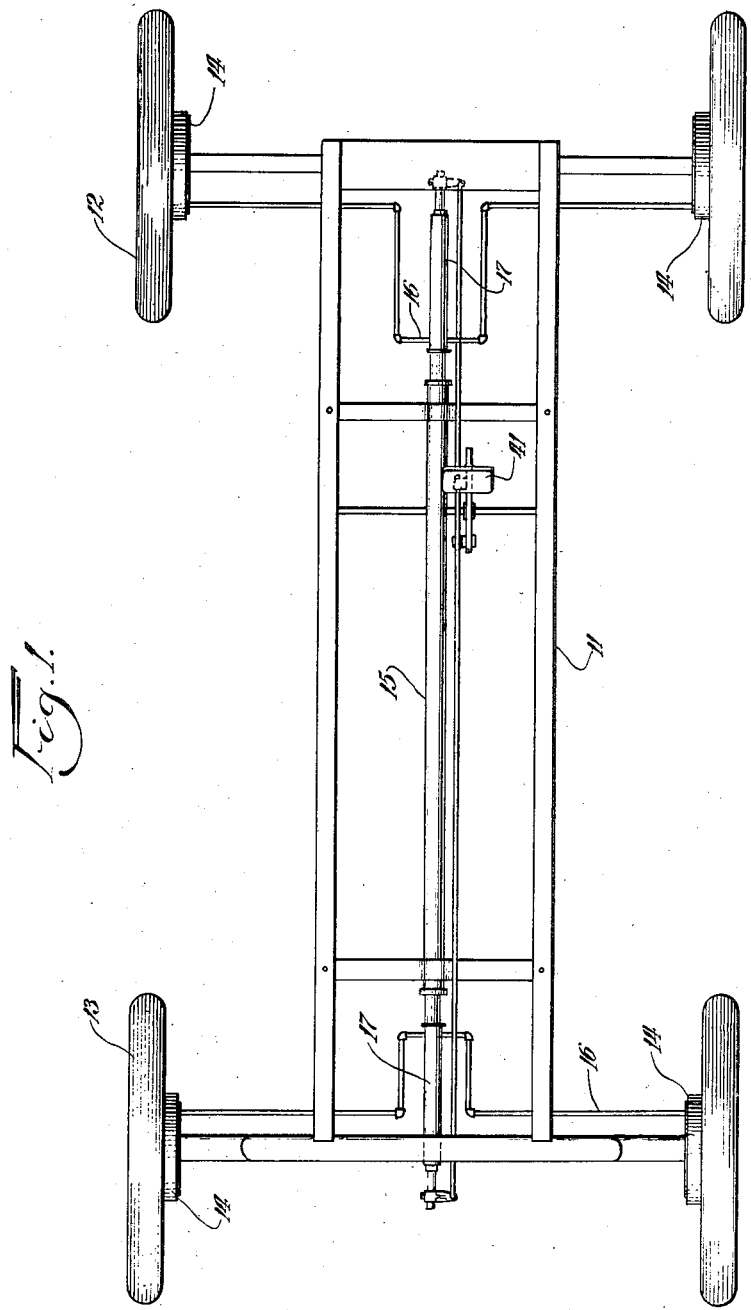

May 18, 1926.
B. A. LINDERMAN
PRESSURE CONTROL VALVE
Filed Nov. 24, 1924
1,585,038
3 Sheets-Sheet 2
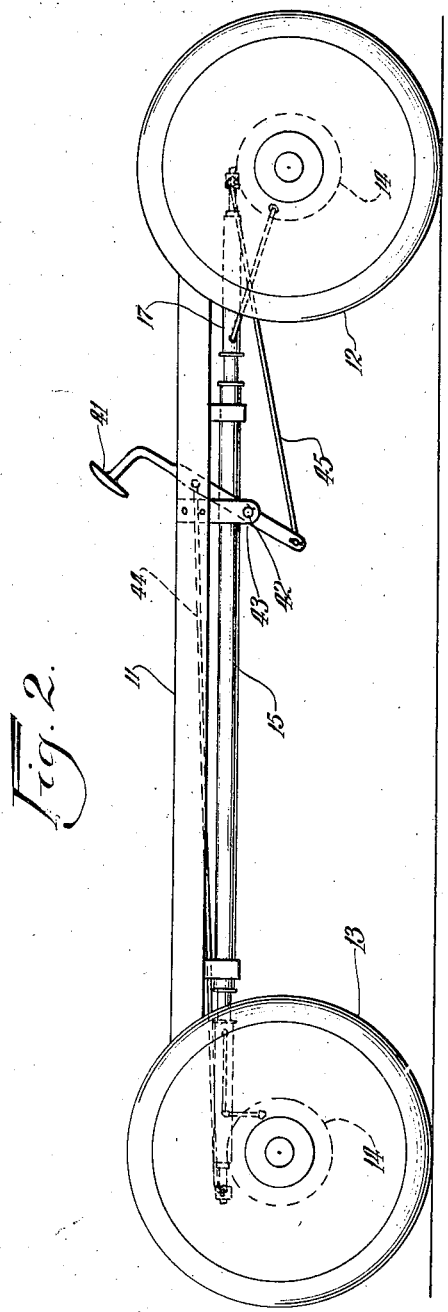
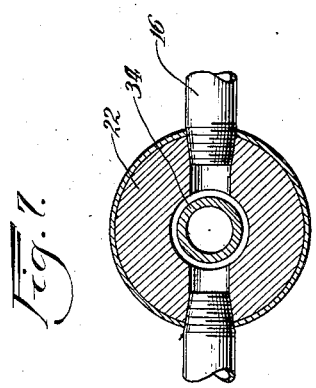
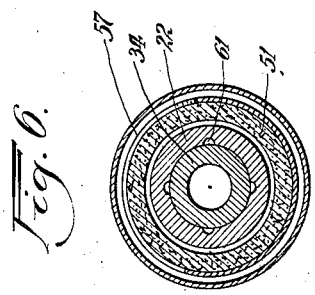
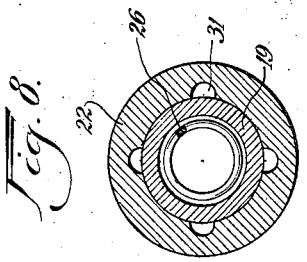
Inventor:
Bert A. Linderman
By Munday, Clarke & Carpenter Attys.

May 18, 1926.
B. A. LINDERMAN
1,585,038
PRESSURE CONTROL VALVE
Filed Nov. 24, 1924
3 Sheets-Sheet 3
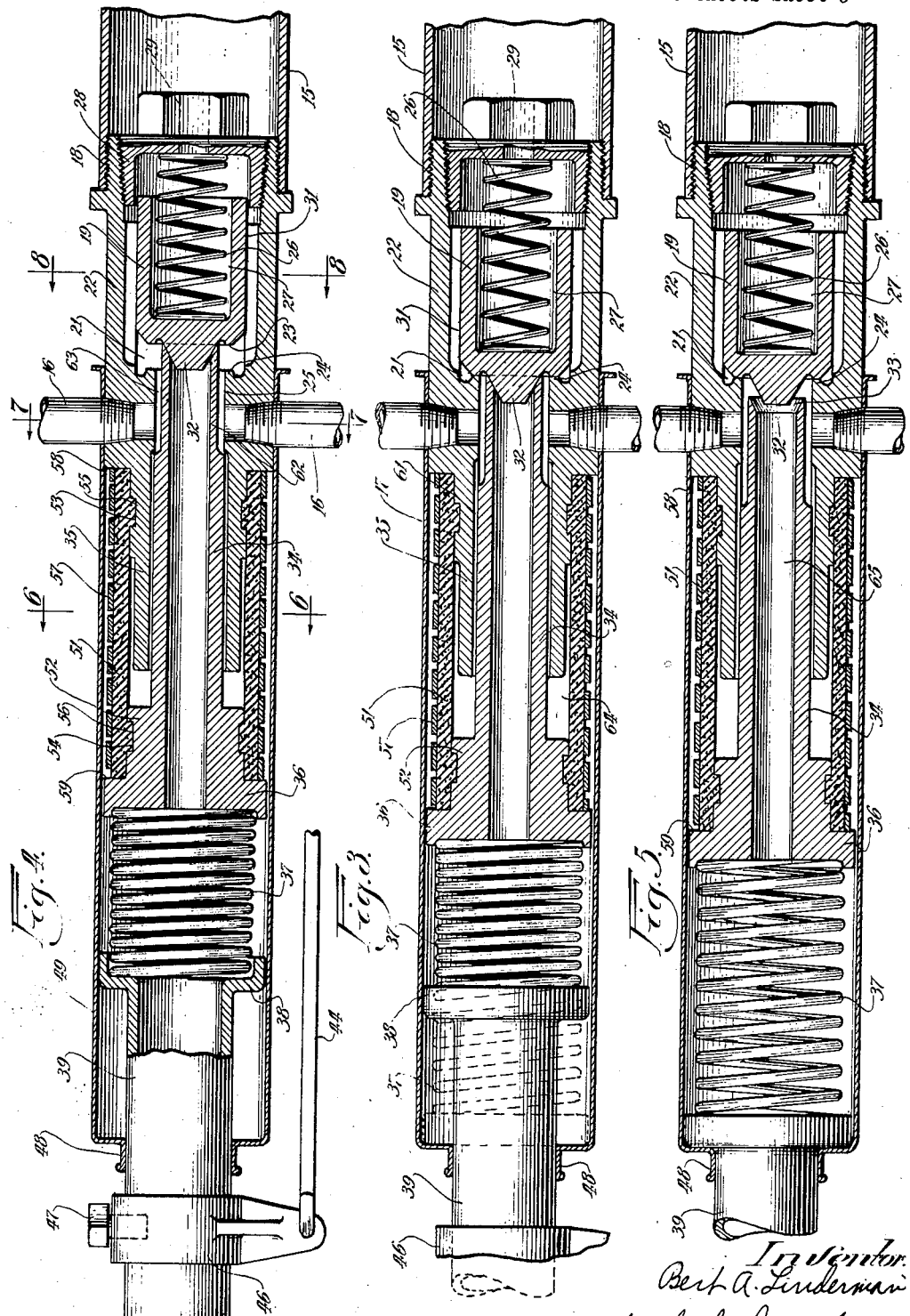

Patented May 18, 1926.

1,585,038

UNITED STATES PATENT OFFICE.

BERT A. LINDERMAN, OF NEW YORK, N. Y., ASSIGNORS TO LINDERMAN & COMPANY, OF WILMINGTON, DELAWARE, A CORPORATION OF DELAWARE.

PRESSURE-CONTROL VALVE.

Application filed November 24, 1924. Serial No. 751,879.

My present invention relates to apparatus operated by pneumatic or liquid pressure, and while I have shown it as embodied in automobile braking mechanism, it is contemplated that it may be used in many other connections and it is desired that it shall be considered as relating to fluid pressure tools and mechanism generally.

The primary object of the invention is the provision of a fluid pressure control valve which will establish and maintain a uniform pressure for actuating the mechanism operated thereby, which pressure may be of any predetermined value and will be directly proportional to the force applied to operate the valve.

Another important feature of the invention consists in an exhaust valve automatically operable under predetermined conditions to relieve the pressure upon the operating mechanism.

A further object of the invention is the provision of a proportional pressure supply valve and an automatic exhaust valve of the above character associated in such relationship as to form a single unit consisting of interrelated cooperating parts and capable of being conveniently mounted and operated by relatively simple and inexpensive mechanism.

Numerous other objects and advantages of the invention will be apparent as it is better understood from the following description, which, taken in connection with the accompanying drawings, discloses a preferred embodiment thereof.

In the drawings I have shown, for illustrative purposes only, a preferred form of my invention, in which, Figure 1 is a diagrammatic plan view of an automobile chassis, showing the manner in which the control valve, in which my invention is embodied, may be mounted when used as a part of the braking system of an automobile;

Fig. 2 is a side elevation of the parts shown in Fig. 1;

Fig. 3 is a longitudinal sectional view of the valve, showing the position of the parts at two stages of the operation;

Fig. 4 is a similar view, showing the position of the parts at another stage of the operation;

Fig. 5 is a like view, showing the position of the parts at a fourth stage;

Fig. 6 is a transverse sectional view of the valve, taken substantially on the section line 6—6 in Fig. 4; and Figs. 7 and 8 are similar views, taken respectively upon the section lines 7—7 and 8—8 of Fig. 4.

Referring in detail to the embodiment of the invention shown upon the drawings, the reference numeral 11 indicates the frame of an automobile, the front and rear wheels of which are indicated respectively by the numerals 12 and 13. As shown, the automobile is provided with brakes 14 at each of the four wheels thereof, which are operated by means of air or hydraulic pressure control, in the manner and by the mechanism provided by my invention.

An elongated cylinder 15 is mounted beneath the chassis and is provided at its opposite ends with fluid pressure valves of similar construction, which are illustrated in detail in Figs. 3 to 8, inclusive. Said cylinder 15 is adapted to contain compressed air or any suitable fluid pressure medium for operation of the brakes with which it is communicably connected by means of conduits 16, leading from opposite sides of the control valve which I have indicated generally by the reference character 17. Said valves are screwed into the opposite ends of the cylinder 15, as shown at 18, and except for the fact that they are oppositely disposed, the arrangement and construction is duplicated in each and a description of one will, therefore, suffice for an understanding of both.

A plunger or valve 19 is mounted for movement in a chamber 21 in a valve cylinder 22 and has a circumferential ridge 23 on the front end thereof, which ridge is normally held in contact with a shoulder 24 formed upon an inwardly extending portion 25 of the valve cylinder 22 at the forward end of the chamber 21. Said shoulder 24 forms a valve seat against which the plunger 19 is normally held, by means of a spring 26 disposed within a central bore 27 in said plunger and within a cap 28 screwed into the end of the cylinder 22 and having an opening 29 therein communicating with the cylinder 15. Longitudinal fluid passages 31 are provided on the interior of the cylinder 22, in spaced relationship around the plunger 19 (see Fig. 8), the fluid being admitted through these passages to operate the brakes when the valve is opened, in manner to be now described.

Said plunger or valve 19 has a central conical extension 32 at the forward end thereof, which is normally in contact with a beveled inner surface 33 at one end of a slidable tube 34 disposed within a reduced end portion 35 of the cylinder 22 and having at its opposite end a head portion 36 in contact with a coil spring 37, the opposite end of which is disposed in a cup-shaped portion 38 of a reciprocable plunger 39, which is operable by means of a foot lever 41, pivoted at 42 to a depending frame part 43 and connected with the plunger 39 by means of connecting bars 44 and 45, which are secured at their opposite ends to collars 46, secured to the plunger 39 by means of set screws 47. The bar 44 is connected to the foot lever 41, above the pivot point 42, and the bar 45 is connected beneath said pivot point, so that when the foot lever is depressed, said links are actuated in opposite directions to actuate the plunger 39. The plunger 39 extends through a sleeve portion 48 at one end of a shell 49, mounted upon the valve cylinder 22 and enclosing the spring 37 and the enlarged portion 36 of the tube 34 and other associated parts to be later described.

A rubber tube 51 is disposed about the reduced end 35 of the cylinder 22 and a shoulder 52 upon the tube 32, being secured to these parts, respectively, by means of interior projecting portions 53 and 54 disposed respectively in grooves 55 and 56. A metal spiral 57 is disposed about said rubber tube between shoulders 58 and 59, formed respectively upon the cylinder 22 and the tube 34, for the purpose of preventing outward expansion of the tube. Longitudinal passages 61 are provided on the interior of the reduced portion of the cylinder 22 and the tube 34 is reduced at 62 to provide a space 63 through which the fluid passes into the conduits 16.

In operation, the air is admitted to actuate the brakes by depressing the foot lever 41, which, through the link 44, collar 46 and plunger 39, compresses the spring 37 from the position shown in dotted lines in Fig. 3 to the position shown in Fig. 4, the tube 34 being thereby moved against the tension of the spring 26 and moving the plunger 19 therewith to the position shown in said Fig. 4, in which position the fluid is admitted through the opening 29, passages 31 and the space 63 into the conduits 16, as indicated by the arrows upon the drawing. The fluid under pressure continues to enter the braking system until a desired predetermined pressure is attained, which pressure is regulated by the extent of depression of the foot lever 41 and is proportional to the movement of said lever. As the fluid is admitted to the conduits 16, it passes also through the passages 61 into a space 64 between the end of the reduced portion 35 of the cylinder 22 and the shoulder 52 on the tube 34. The pressure in this space 64 is thus equal to the pressure at the brakes and when said pressure but slightly exceeds the pressure applied to the spring 37 through the foot lever 41 and the plunger 39, said tube 34 is moved to the left, viewing Figs. 3 to 5, inclusive, which permits the valve plunger 19 to be seated by means of the spring 26, thus cutting off communication between the supply cylinder 15 and the remainder of the system. When pressure is removed from the foot lever and the plunger 39 is permitted to resume the normal position, shown in dotted lines in Fig. 3 and in full lines in Fig. 5, the pressure within the space 64 will move said tube 34 further to the left, as viewed in said Figs. 3 to 5, breaking the contact between the beveled portion 33 of said tube and the conical extension 32 of the valve plunger and permitting the fluid to exhaust through a central bore 65 in said tube 34 and through the plunger 39, which is hollow and open to exhaust. After the pressure is sufficiently relieved within the system, said tube 34 will be again moved to the right, through the action of the spring 37, to force the beveled end 33 thereof into contact with the valve projection 32, closing the system from exhaust, and the cycle of operations may be repeated by again depressing the foot lever 41.

The purpose of the rubber tube 51 is to seal the chamber 64 in which the pressure medium acts and to take up vibrations of the parts which necessarily occur in maintaining a substantially balanced pressure in the mechanism. These vibrations would otherwise cause a very annoying rattling noise, and the advantages of providing an absolutely air-tight enclosure for the space 64 are evident, since otherwise the pressure medium would escape and impair the efficiency of the device.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A pressure control valve, comprising means providing a valve chamber communicably connected with a source of fluid under pressure and the mechanism to be operated thereby, a valve member movable in said chamber, a valve seat with which said member cooperates to close the valve, and a member movable with respect to said means and yieldingly connected thereto for actuating said valve member to open the valve, said actuating member being operable by predetermined pressure admitted to said mechanism to automatically close the valve.

2. A pressure control valve, comprising means providing a valve chamber communicably connected with a source of fluid under pressure and the mechanism to be operated thereby, a valve member movable in said chamber, a valve seat with which said member cooperates to close the valve, and a member movable with respect to said means and yieldingly connected thereto for actuating said valve member to open the valve, said actuating member being operable by manually applied pressure to open the valve and being automatically operable to close said valve when the pressure admitted to said mechanism overbalances said manually applied pressure.

3. A pressure control valve, comprising means providing a valve chamber communicably connected with a source of fluid under pressure and the mechanism to be operated thereby, a valve member movable in said chamber, a valve seat with which said member cooperates to close the valve, and a member movable with respect to said means and yieldingly connected thereto for actuating said valve member to open the valve, said actuating member being operable by manually applied pressure to open the valve and being automatically operable to close said valve when the pressure admitted to said mechanism overbalances said manually applied pressure, said admitted pressure acting upon and moving said actuating member in the closing action, thereby extending said yielding connection, and yielding means being provided through which said manually applied pressure is imparted to said member, said means yielding proportionately to the movement of said actuating member during said valve closing action.

4. A pressure control valve, comprising means providing a valve chamber communicably connected with a source of fluid under pressure and the mechanism to be operated thereby, a valve member movable in said chamber, a valve seat with which said member cooperates to close the valve, and a member movable with respect to said means and yieldingly connected thereto for actuating said valve member to open the valve, said actuating member being operable by manually applied pressure to open the valve and being automatically operable to close said valve when the pressure admitted to said mechanism overbalances said manually applied pressure, said admitted pressure acting upon and moving said actuating member in the closing action, thereby extending said yielding connection, and yielding means being provided through which said manually applied pressure is imparted to said member, said means yielding proportionately to the movement of said actuating member during said valve closing action and said actuating member being further movable when said manually applied pressure is removed to open said mechanism to exhaust.

5. A pressure control valve, comprising a member providing a valve chamber and a valve seat therein, a plunger in said chamber, spring means holding said plunger in contact with said seat, a movable valve-actuating and exhaust member engageable with said plunger, an elastic connection between said members, and means including a spring for applying pressure to said actuating member to open the valve and admit the pressure to a space closed to the outside atmosphere, the pressure admitted through the valve acting upon said member when it overbalances the applied pressure to automatically close the valve and to maintain the admitted pressure at predetermined value.

6. A pressure control valve, comprising a member providing a valve chamber and a valve seat therein, a plunger in said chamber, spring means holding said plunger in contact with said seat, a movable valve-actuating and exhaust member engageable with said plunger, an elastic connection between said members, and means including a spring for applying pressure to said actuating member to open the valve and admit the pressure to a space closed to the outside atmosphere, the pressure admitted through the valve acting upon said member when it overbalances the applied pressure to automatically close the valve and to maintain the admitted pressure at predetermined value, said admitted pressure causing further movement of said member to disengage it from said plunger and open said closed space to exhaust when said applied pressure is removed.

7. A pressure control valve, comprising a member providing a valve chamber and a valve seat therein, a plunger in said chamber, spring means holding said plunger in contact with said seat, a movable valve-actuating and exhaust member engageable with said plunger, an elastic hermetic connection between said members, and means including a spring for applying pressure to said actuating member to open the valve and admit the pressure to a space closed to the outside atmosphere, the pressure admitted through the valve acting upon said member when it overbalances the applied pressure to automatically close the valve and to maintain the admitted pressure at predetermined value.

8. A fluid pressure control valve, comprising a valve casing communicably connected with a source of fluid pressure medium and with the mechanism to be operated thereby, a valve seat within said casing, a movable valve member normally held in contact with said seat, devices for operating the valve including a yieldable element and a member subject to the pressure of the fluid medium admitted through the valve, and an hermetic enclosure within which the pressure medium enters to actuate said member and thereby automatically close the valve when the pressure admitted thereby has attained a predetermined value.

9. A fluid pressure control valve, comprising a valve casing communicably connected with a source of fluid pressure medium and with the mechanism to be operated thereby, a valve seat within said casing, a movable valve member normally held in contact with said seat, devices for operating the valve including a yieldable element and a member subject to the pressure of the fluid medium admitted through the valve, and an hermetic and resilient enclosure within which the pressure medium enters to actuate said member and thereby automatically close the valve when the pressure admitted thereby has attained a predetermined value.

10. A fluid pressure control valve, comprising a valve casing communicably connected with a source of fluid pressure medium and with the mechanism to be operated thereby, a valve seat within said casing, a movable valve member normally held in contact with said seat, devices for operating the valve including a yieldable element and a member subject to the pressure of the fluid medium admitted through the valve, and a rubber tube connecting said member with the valve casing and providing an hermetically sealed chamber into which the pressure medium enters to actuate said member and thereby automatically close the valve when the pressure admitted thereby has attained a predetermined value.

11. A fluid pressure control valve, comprising a valve casing communicably connected with a source of fluid pressure medium and with the mechanism to be operated thereby, a valve seat within said casing, a movable valve member normally held in contact with said seat, devices for operating the valve including a yieldable element and a member subject to the pressure of the fluid medium admitted through the valve, and a tube of resilient material connecting said member with the valve casing and providing an hermetically sealed chamber into which the pressure medium enters to actuate said member and thereby automatically close the valve when the pressure admitted thereby has attained a predetermined value.

12. A fluid pressure control valve, comprising a valve casing communicably connected with a source of fluid pressure medium and with the mechanism to be operated thereby, a valve seat within said casing, a movable valve member normally held in contact with said seat, devices for operating the valve including a yieldable element and a member subject to the pressure of the fluid medium admitted through the valve, and a sealing tube connecting said member with the valve casing and providing an hermetically sealed chamber into which the pressure medium enters to actuate said member and thereby automatically close the valve when the pressure admitted thereby has attained a predetermined value.

13. A fluid pressure control valve, comprising a valve casing communicably connected with a source of fluid pressure medium and with the mechanism to be operated thereby, a valve seat within said casing, a movable valve member normally held in contact with said seat, devices for operating the valve including a yieldable element and a member subject to the pressure of the fluid medium admitted through the valve, and a sealing tube having inwardly extending portions embedded in said member and said valve casing, said tube providing an hermetically sealed chamber into which the pressure medium enters to actuate said member and thereby automatically close the valve when the pressure admitted thereby has attained a predetermined value.

14. A pressure control valve, comprising a member providing a valve chamber and a valve seat therein, a plunger in said chamber, a movable valve-actuating member engageable with said plunger, an hermetic connection between said members, and means including a yieldable element for applying pressure to said actuating member to open the valve and admit the pressure to a space closed to the outside atmosphere, the pressure admitted through the valve acting upon said member when it overbalances the applied pressure to automatically close the valve and to maintain the admitted pressure at predetermined value.

15. A pressure control valve, comprising a member providing a valve chamber and a valve seat therein, a plunger in said chamber, a movable valve-actuating and exhaust member engageable with said plunger, an hermetic connection between said members, and means including a yieldable element for applying pressure to said actuating member to open the valve and admit the pressure to a space closed to the outside atmosphere, the pressure admitted through the valve acting upon said member when it overbalances the applied pressure to automatically close the valve and to maintain the admitted pressure at predetermined value, said admitted pressure causing further movement of said member to disengage it from said plunger and open said closed space to exhaust when said applied pressure is removed.

16. In an automotive vehicle, the combination of a brake element to be operated, a source of fluid pressure, a control valve including a valve seat, a pedal, a plunger directly connected to and longitudinally slidable by the operation of said pedal, a coil spring tensioned by the movement of said plunger, a shiftable valve, means normally seating said valve to its seat, and a valve actuator operated by the tensioning of said coil spring for unseating said valve to admit fluid pressure from said source to the brake element when said pedal is operated.

17. In an automotive vehicle, the combination of a plurality of brake elements for operating a plurality of wheel brakes, a pressure cylinder carried by the vehicle, a pedal, a control valve located in each end of the cylinder, said control valve having a valve seat, a plunger longitudinally operable through the end of each valve, means connecting said pedal to each plunger, a pressure connection from each valve to the several brake elements, a shiftable valve in each control valve, means normally seating each shiftable valve on its control valve seat, a coil spring in each control valve tensioned by the actuation of the plunger, a valve actuator operable by the tensioning of each coil spring for shifting its valve to admit pressure from the cylinder to the pressure connections to operate the brake element.

18. A pressure control valve, comprising, a chamber having a valve seat therein, a valve member having a valve part adapted to engage said seat and having an admission valve part and an exhaust valve part, a spring normally pressing said admission valve part against said seat, an exhaust conduit, a spring for pressing said exhaust conduit against the exhaust part of said valve, a manually operable device acting through said last-mentioned spring to cause said exhaust conduit to move said valve member to permit admission, the parts being arranged to cause the admitted pressure to compress said last-mentioned spring to close the apparatus to admission when the pressure admitted equals the pressure applied to said last-mentioned spring.

19. A control valve for pressure applied brakes, comprising a member forming a valve seat, a shiftable valve within said member and having a portion adapted to contact said valve seat, a spring for normally forcing said valve to said valve seat, said shiftable valve having a conical portion within the valve seat contacting portion, a valve actuating member having a bore therethrough and formed on its end with a beveled wall to engage the conical surface of said shiftable valve and provided with a piston for shifting said valve actuating member in one direction, yieldable means for shifting said valve actuating member in the opposite direction, a source of air pressure, and means forming a connection therefrom to said valve seat and from said valve seat to the piston portion of said valve actuating member and to the hollow bore of said valve actuating member.

20. In a control valve for a brake operating mechanism of an automotive vehicle, the combination of a substantially cylindrical member formed with a valve seat, and a peripheral recess provided with a shoulder, a valve shiftable within said member and adapted to contact with said valve seat, a spring for shifting said valve, a valve actuating member adapted to shift said valve, said valve actuating member having a piston surface and a peripheral recess substantially registering with the peripheral recess of said casing, a yieldable packing sleeve lying in the peripheral recesses of said casing and valve actuating member and formed to engage the shoulders thereof, and means for maintaining said packing sleeve in position in said recess, a source of air pressure and connections therefrom to said valve seat and to the piston portion of said valve actuating member, and means for shifting said valve actuating member.

21. In a control valve of the character described, the combination of an air pressure cylinder, an extension cylinder projecting from one end thereof, a pedal actuated plunger projecting and operating through the opposite end of said extension cylinder, said extension cylinder forming a valve seat, a shiftable valve in said extension cylinder, a spring normally closing said valve on said valve seat, an air conduit connection from said air pressure cylinder to said valve seat, a valve actuating member within said extension cylinder and shiftable longitudinally thereof, a coil spring between said plunger and said valve actuating member, said valve actuating member and said plunger being bored to provide an air relief, and said valve actuating member having a piston portion, pressure actuating connection from said valve seat to said piston portion, said bore of said valve actuating member being open and arranged to seat on said shiftable valve, and a pressure operated connection from said valve seat to an element to be operated.

BERT A. LINDERMAN.